(12) United States Patent
Schweinberg et al.

(10) Patent No.: US 10,647,483 B2
(45) Date of Patent: May 12, 2020

(54) UTILITY COVER IDENTIFICATION SYSTEM

(71) Applicant: Hubbell Incorporated, Shelton, CT (US)

(72) Inventors: Fred Matthew Schweinberg, Knoxville, TN (US); Steve A. Castle, Kingston, TN (US); Mike E. Fisher, Knoxville, TN (US); Mark E. Mikes, Aiken, SC (US); Eric M. Slater, Kingston, TN (US); Wiley R. Tipton, Friendsville, TN (US)

(73) Assignee: HUBBELL INCORPORATED, Shelton, CT (US)

( * ) Notice: Subject to any disclaimer, the term of this patent is extended or adjusted under 35 U.S.C. 154(b) by 463 days.

(21) Appl. No.: 15/048,702

(22) Filed: Feb. 19, 2016

(65) Prior Publication Data
US 2016/0167851 A1 Jun. 16, 2016

Related U.S. Application Data

(62) Division of application No. 12/805,148, filed on Jul. 14, 2010, now Pat. No. 9,296,527.

(51) Int. Cl.
| | |
|---|---|
| *B65D 51/24* | (2006.01) |
| *B25H 3/02* | (2006.01) |
| *B65D 25/20* | (2006.01) |
| *B65D 43/02* | (2006.01) |
| *B29C 39/10* | (2006.01) |
| *B29C 65/48* | (2006.01) |
| *B29C 65/66* | (2006.01) |

(Continued)

(52) U.S. Cl.
CPC ............. *B65D 51/245* (2013.01); *B25H 3/02* (2013.01); *B29C 39/10* (2013.01); *B29C 65/48* (2013.01); *B29C 65/66* (2013.01); *B29C 66/02242* (2013.01); *B65D 25/205* (2013.01); *B65D 43/0202* (2013.01); *B29L 2017/00* (2013.01); *B29L 2031/712* (2013.01); *B65D 2203/00* (2013.01)

(58) Field of Classification Search
CPC ..... B25H 3/02; B29C 65/02242; B29C 65/48; B29C 65/66; B65D 25/205; B65D 51/245; B65D 81/366; E04H 13/003; H02G 15/10
See application file for complete search history.

(56) References Cited

U.S. PATENT DOCUMENTS

| 1,051,354 A | * | 1/1913 | Strachan | .................... G09F 7/00 |
| | | | | 40/612 |
| 1,919,530 A | * | 7/1933 | Rieck | ..................... E04H 13/003 |
| | | | | 52/103 |

(Continued)

FOREIGN PATENT DOCUMENTS

EP 2966599 A1 * 1/2016 ......... B28B 23/0031

*Primary Examiner* — Jacob J Cigna
(74) *Attorney, Agent, or Firm* — Dickinson Wright PLLC

(57) ABSTRACT

A utility cover identification system including a cover, a tray having a recess and being embedded within the cover, and an identification plate insertable into the tray to engage the tray recess to retain the identification plate within the tray. A method of forming the cover identification system includes the steps of coupling the cover and a tray together, curing the cover to secure the tray to the cover, and inserting an identification plate into the tray and retaining the identification plate in the tray.

6 Claims, 12 Drawing Sheets

(51) Int. Cl.
  *B29C 65/00* (2006.01)
  *B29L 17/00* (2006.01)
  *B29L 31/00* (2006.01)

(56) References Cited

U.S. PATENT DOCUMENTS

| | | | | |
|---|---|---|---|---|
| 2,113,285 A * | 4/1938 | Wamser | G09F 7/10 | 40/618 |
| 2,597,003 A * | 5/1952 | Johnson | G09F 7/10 | 40/124.5 |
| 3,769,725 A * | 11/1973 | Stewart, Jr. | G09F 3/185 | 40/643 |
| 4,163,503 A * | 8/1979 | McKinnon | H02G 9/10 | 137/371 |
| 4,285,149 A * | 8/1981 | Berryhill | G09F 3/206 | 40/124.5 |
| 5,056,454 A * | 10/1991 | Turner | G01C 15/02 | 116/209 |
| 5,101,755 A * | 4/1992 | Barrett | E01F 9/541 | 116/209 |
| 5,462,383 A * | 10/1995 | Van 'T Veer | E01C 11/227 | 404/4 |
| 5,911,192 A * | 6/1999 | Yap | B67D 7/04 | 116/200 |
| 5,967,307 A * | 10/1999 | Wang | A47G 19/2227 | 206/217 |
| 6,061,940 A * | 5/2000 | Rice | G09F 7/00 | 206/575 |
| 6,070,754 A * | 6/2000 | Newby, Sr. | A45C 3/02 | 220/4.21 |
| 6,626,295 B1 * | 9/2003 | Vasudeva | B25H 3/023 | 206/373 |
| 6,932,099 B2 * | 8/2005 | Mahaney | H02G 9/10 | 137/15.08 |
| 7,030,315 B1 * | 4/2006 | Dunn | H02G 9/10 | 174/17 R |
| 7,059,472 B2 * | 6/2006 | Lai | B25H 3/02 | 206/372 |
| 7,377,603 B2 * | 5/2008 | Quijano | G06F 1/181 | 312/223.1 |
| 7,380,358 B2 * | 6/2008 | Bazany | B65D 25/205 | 206/459.5 |
| 7,385,137 B2 * | 6/2008 | Burke | G02B 6/4451 | 174/37 |
| 7,828,138 B2 * | 11/2010 | Stukenkemper | A45C 11/34 | 206/214 |
| 9,919,853 B2 * | 3/2018 | Freeman | B65D 55/02 | |
| 2003/0000863 A1 * | 1/2003 | Lee | B25H 3/02 | 206/459.5 |
| 2005/0109650 A1 * | 5/2005 | Huang | A45C 13/08 | 206/372 |
| 2005/0189005 A1 * | 9/2005 | Smith | E04H 12/2246 | 135/16 |
| 2005/0236290 A1 * | 10/2005 | Ohi | A01K 97/06 | 206/373 |
| 2006/0006240 A1 * | 1/2006 | Singleton | G09F 3/04 | 235/487 |
| 2007/0194493 A1 * | 8/2007 | Jurich | E02D 29/14 | 264/268 |
| 2008/0263920 A1 * | 10/2008 | Trigg | G09F 3/00 | 40/299.01 |
| 2009/0072978 A1 * | 3/2009 | Tilson, Jr. | B28B 23/00 | 340/572.9 |
| 2009/0282716 A1 * | 11/2009 | Barbieri | G09F 7/002 | 40/606.01 |
| 2016/0336728 A1 * | 11/2016 | Tramm | E05B 65/0089 | |

* cited by examiner

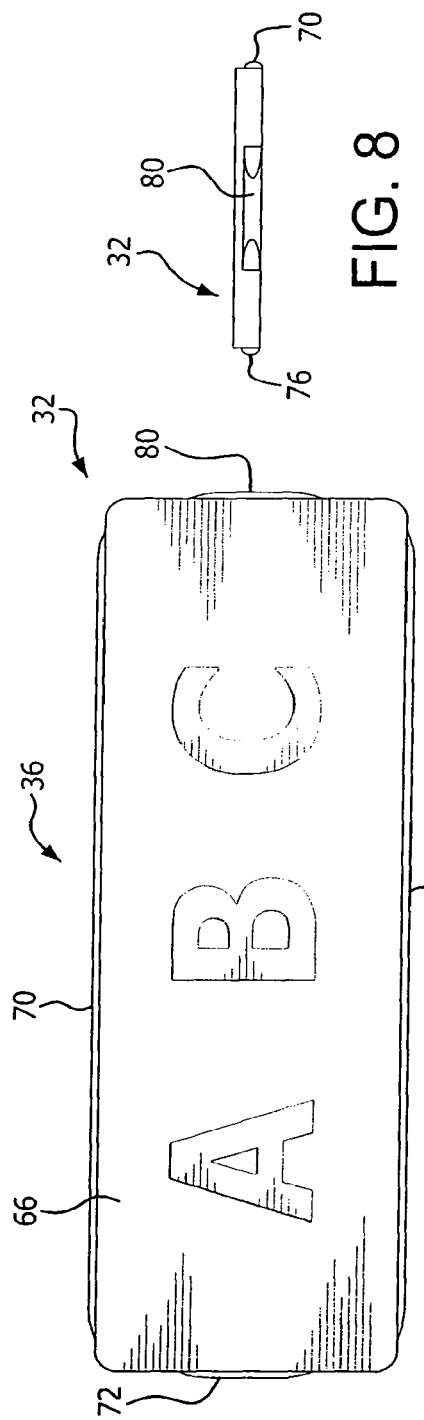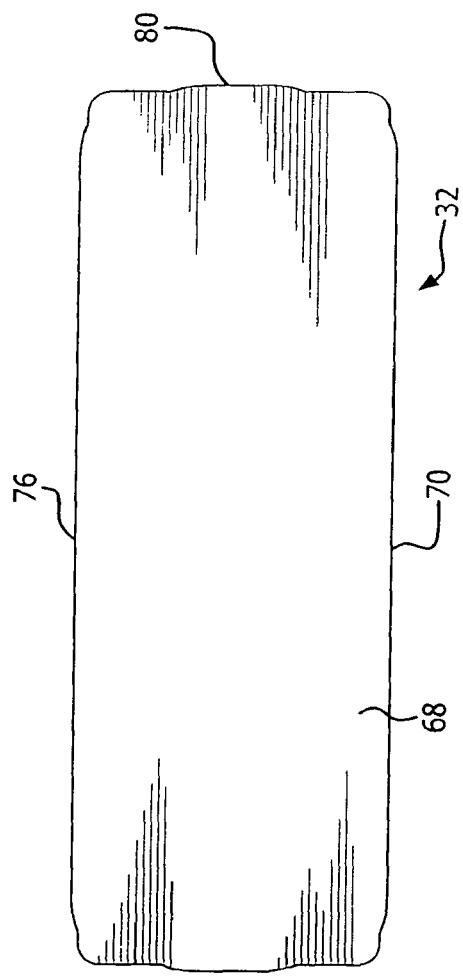
FIG. 5  FIG. 6  FIG. 7  FIG. 8

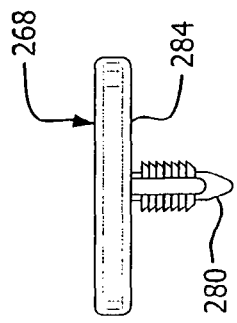
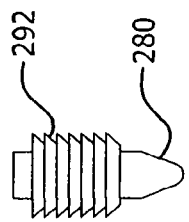
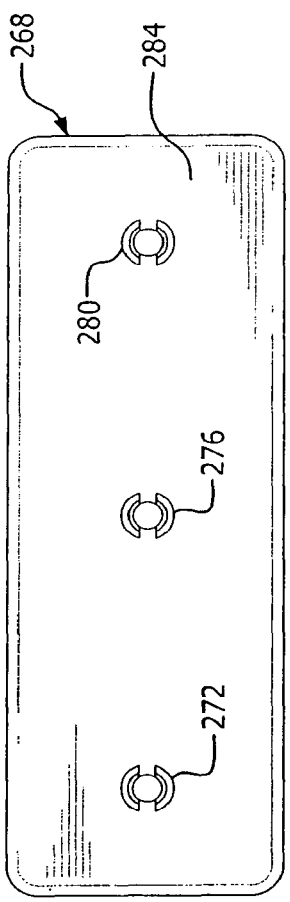
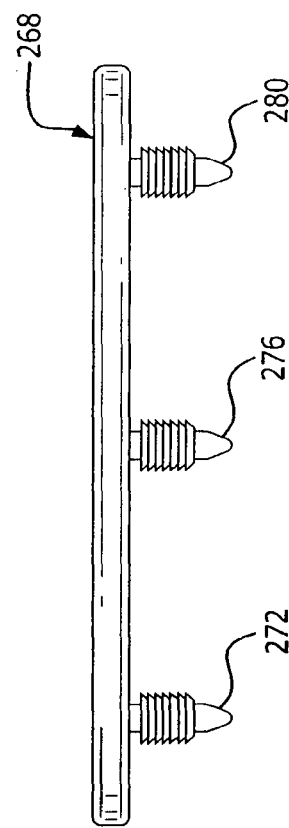
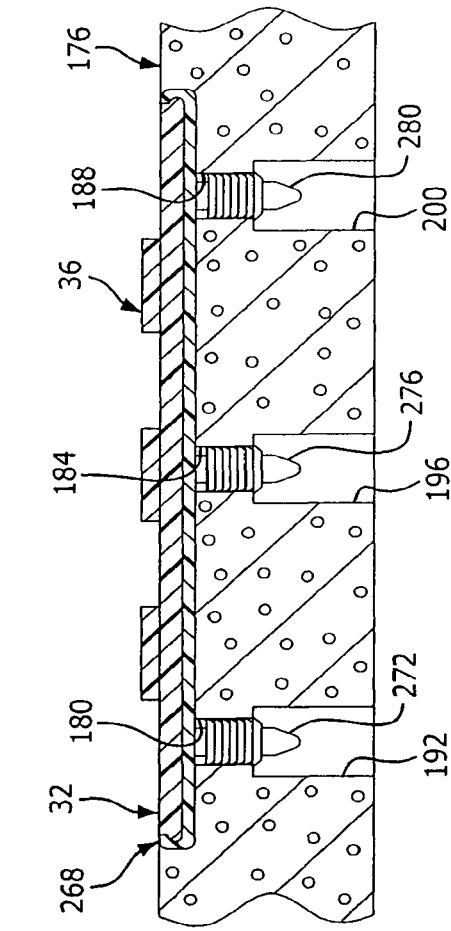

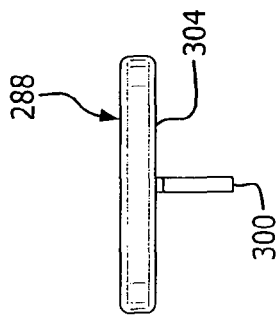
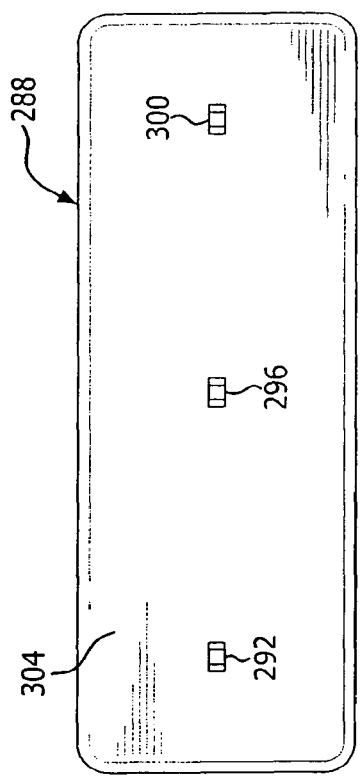
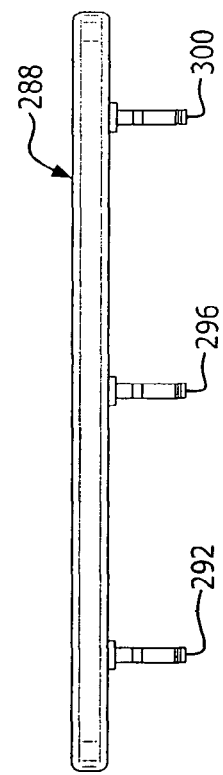
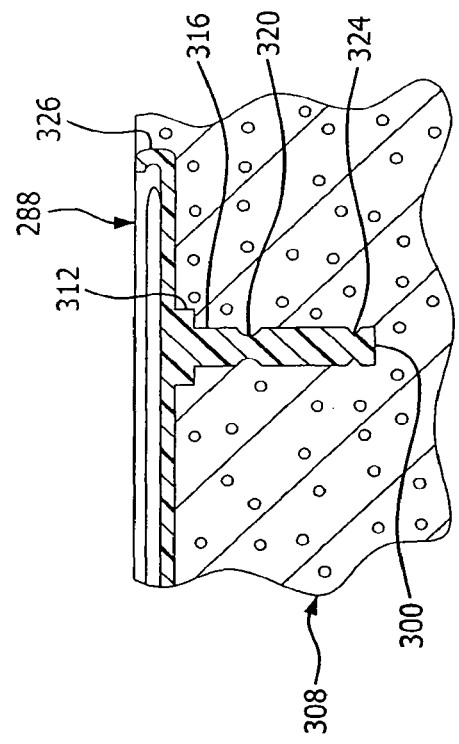

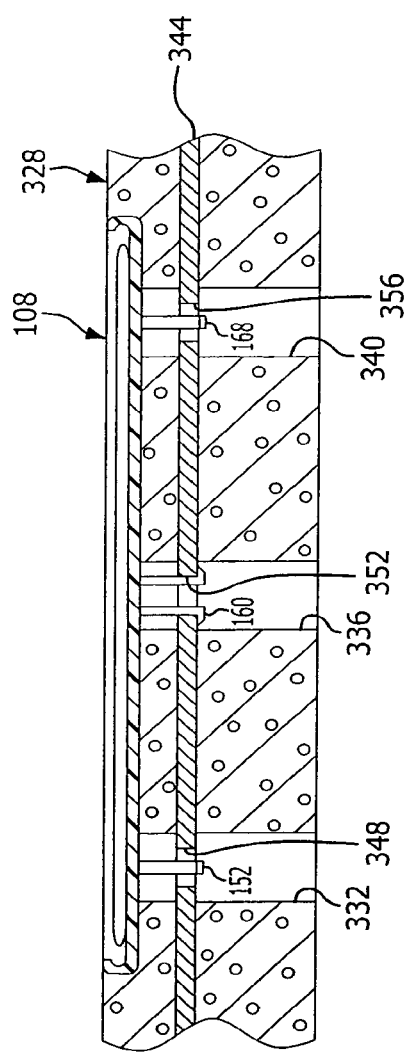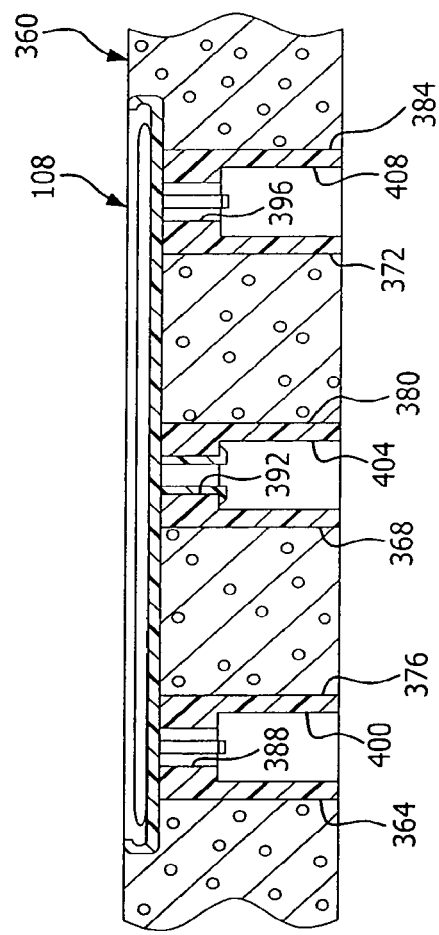

UTILITY COVER IDENTIFICATION SYSTEM

RELATED APPLICATIONS

This application is a divisional of currently pending U.S. patent application Ser. No. 12/805,148, which is hereby incorporated by reference in its entirety, and which was filed on Jul. 14, 2010.

BACKGROUND OF THE INVENTION

1. Field of the Invention

The present invention relates to utility covers, and more particularly, to utility cover identification systems.

2. Description of the Related Art

Identification indicia, such as company and other organization logos, trademarks, service marks, product names, and product or utility classifications have heretofore been applied to products in a variety of manners. Effective methods for applying such identification indicia to utility covers include painting, silk-screening, molding, embossing, and engraving. While these methods may be potentially cost-efficient for large production runs, cost efficiency decreases as size of the production run decreases. Correspondingly, the cost and storage space for maintaining inventory increases with the variety of identification indicia and the variety of sizes of utility covers.

Accordingly, plates bearing identification indicia (hereinafter identification plates) that attach to objects have been developed. One way to attach an identification plate to a cover is to use an adhesive and press the identification plate either onto the surface of the cover or into a recess on the surface of the cover. But if the surface or recess are not clean and dry, the adhesive may not hold. Additionally, if the adhesive and identification plate are applied further down the supply chain, for example, at a distributor, and the distributor does a sloppy glue job, such actions may reflect on and cause problems for the manufacturer. Further, such glued-on identification plates may come off and/or crack from thermal expansion and contraction.

Other methods for attaching identification plates to covers include fasteners, such as rivets, bolts, and other through-fasteners, but such methods increase the time and labor required, and thus the cost of producing such covers. Moreover, material choices for such covers may provide additional difficulties. For example, devices and methods in which appendages of the identification plate are inserted into apertures of the cover depend upon the dimensional accuracy of such apertures, both at the time of manufacture and throughout the life of the cover. Obtaining sufficient dimensional accuracy to ensure retention of such identification plates may be difficult in materials that are suitable for the exposed-environment lifecycle of such utility covers.

Examples of known apparatus and methods for securing identification indicia are disclosed in the following U.S. patent publications and patents, the disclosures of which are incorporated herein by reference in their entirety: U.S. Pat. No. 7,377,603 to Quijano, U.S. Pub. 2003/0000863 to Lee, U.S. Pub. 2005/0109650 to Huang, U.S. Pub. 2005/0189005 to Smith et al, U.S. Pub. 2006/0006240 to Singleton, and U.S. Pub. 2008/0263920 to Trigg et al.

SUMMARY OF EMBODIMENTS OF THE INVENTION

Accordingly, it is an object of the present invention to provide identification indicia for a utility cover that is easily installed. It is another object of the present invention to provide identification indicia that are installable in a variety of utility covers. It is yet another object of the present invention to provide identification indicia to withstand the exposed-environment lifecycle of the utility cover.

The foregoing and/or other objects of the present invention are basically attained by providing a utility cover identification system including: a cover; a tray having a recess and being embedded within the cover; and an identification plate insertable into the tray to engage the tray recess to retain the identification plate within the tray.

The foregoing and/or other objects of the present invention are also basically attained by providing a utility cover identification system including: a cover; a tray cast into a top surface of the cover during casting of the cover and having at least one recess on an internal side thereof; and an identification plate having at least one edge protrusion complimentary to the tray recess and engaging the tray recess to retain the identification plate in the tray when the identification plate is inserted into the tray.

The foregoing and/or other objects of the present invention are also basically attained by providing a method of manufacturing a utility cover, the method including the steps of: forming the cover with a recess in the top of the cover, inserting a tray into the recess of the cover prior to curing of the cover, curing the cover to secure the tray to the cover, and inserting an identification plate into the tray and retaining the identification plate in the tray.

Other objects, advantages, and salient features of the present invention will become apparent from the following detailed description, which, taken in conjunction with the annexed drawings, discloses preferred embodiments of the invention as defined in the annexed claims.

BRIEF DESCRIPTION OF THE DRAWINGS

Referring now to the drawings, which form a part of this original disclosure:

FIG. 5 is a top plan view of an identification plate in accordance with an embodiment of the present invention;

FIG. 6 is a side elevational view of the identification plate of FIG. 5;

FIG. 7 is a bottom plan view of the identification plate of FIG. 5;

FIG. 8 is a right end elevational view of the identification plate of FIG. 5;

FIG. 26 is a bottom plan view of a tray in accordance with a sixth embodiment of the present invention;

FIG. 27 is a side elevational view of the tray of FIG. 26;

FIG. 28 is a right end elevational view of the tray of FIG. 26;

FIG. 29 is an enlarged elevational view of a boss of the tray of FIG. 26;

FIG. 30 is a vertical cross-sectional view in side elevation of a utility cover, an identification plate, and the tray of FIG. 26;

FIG. 31 is a bottom plan view of a tray in accordance with a seventh embodiment of the present invention;

FIG. 32 is a side elevational view of the tray of FIG. 31;

FIG. 33 is a right end elevational view of the tray of FIG. 31;

FIG. 34 is an enlarged elevational view of portions of a cover and the tray of FIG. 31;

FIG. 35 is a vertical cross-sectional view in side elevation of a cover in accordance with an eighth embodiment of the present invention and the tray of FIG. 13;

FIG. 36 is a vertical cross-sectional view in side elevation of a cover in accordance with a ninth embodiment of the present invention and the tray of FIG. 13;

DETAILED DESCRIPTION OF THE PREFERRED EMBODIMENTS

Figure 1:
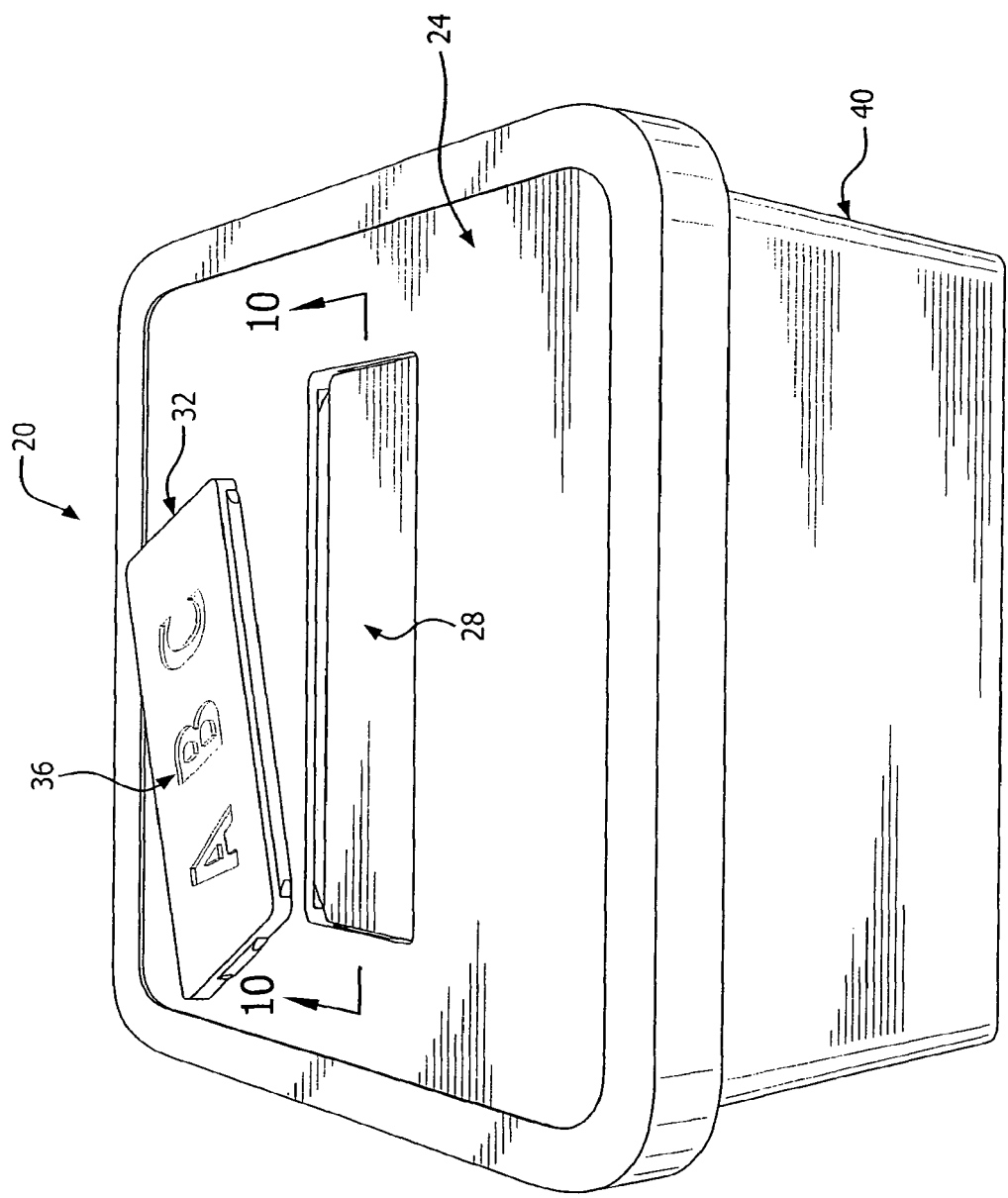
FIG. 1 is a perspective view of a utility cover identification system in accordance with an embodiment of the present invention.

Reference will now be made in detail to embodiments of the present invention, examples of which are illustrated in the accompanying drawings, wherein like reference numerals refer to the like elements throughout. The embodiments described exemplify the present invention by referring to the drawings.

As seen in FIGS. 1-10, a utility cover identification system 20 comprises a utility cover 24, a tray 28, and an identification plate 32. In FIG. 1, the identification plate 32 is illustrated as having identification indicia 36 on a top surface thereof. The identification indicia 36 may be, for example, molded in or engraved on the identification plate 32. Additionally, the identification indicia 36 may be relieved below the top surface of the identification plate 32, remain flush with the top surface, or may stand proud of the top surface (see FIG. 30).

The utility cover 24 (hereinafter referred to as a cover for brevity) covers, for example, an opening to a utility box 40 that houses utility equipment, such as a communications distribution hub, sewer, water, electrical, or gas line access points, or utility metering equipment. According to one embodiment, the cover 24 is formed of plastic, such as high density polyethylene (HDPE), polypropylene, acrylonini-trile-butadiene-styrene (ABS), low density polyethylene, (LDPE), or PVC. According to another embodiment, the cover 24 is formed of nylon, glass filled nylon, or fiberglass. According to yet another embodiment, the cover 24 is formed of polymer concrete, which uses polyester resin to replace or supplement cement as a binder. In comparison to concrete using only cement as a binder, polymer concrete has improved chemical resistance, is stronger, and when it fails, does not fail catastrophically. Additionally, polymer concrete has improved flexural and compressive strength. And, particularly with the addition of fiberglass, polymer concrete has better tensile performance as well. Further, polymer concrete has low permeability to water and good resistance against corrosion, as well as good long-term durability with respect to freeze and thaw cycles.

Figure 4:
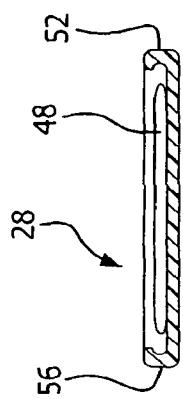
FIG. 4 is a right elevational view of the tray of FIG. 2 in cross-section taken along line 4-4 in FIG. 2.
Figure 2:
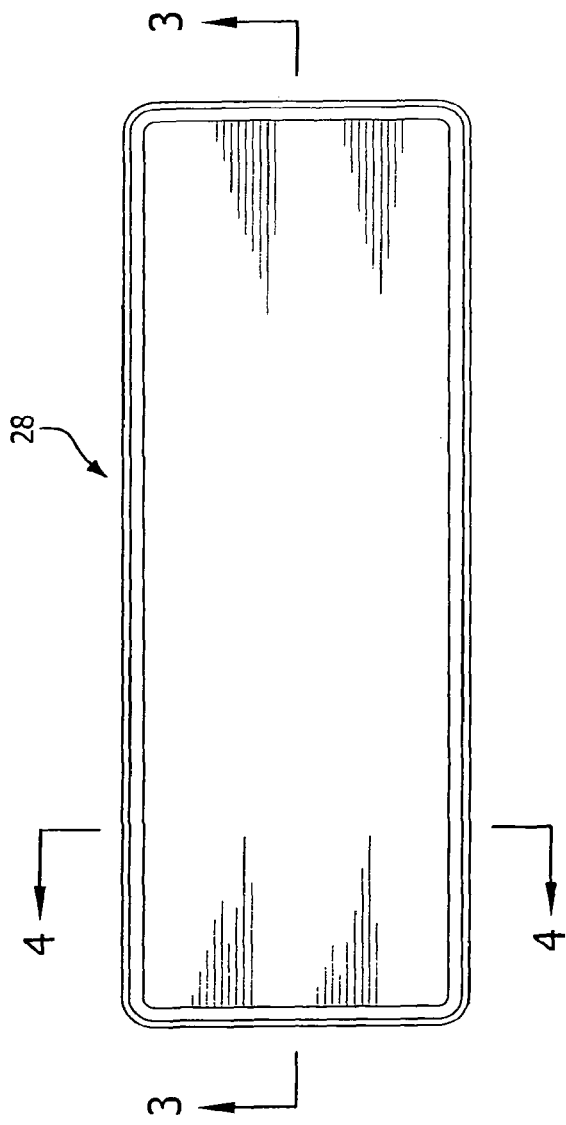
FIG. 2 is a top plan view of a tray in accordance with an embodiment of the present invention.
Figure 3:
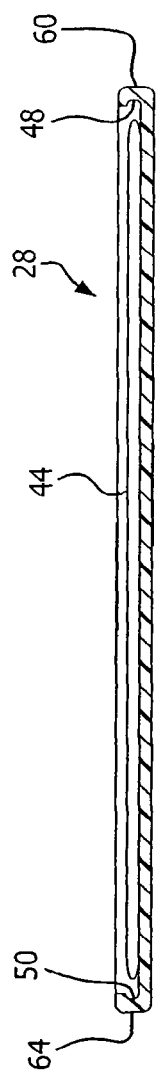
FIG. 3 is a side elevational view in cross-section taken along line 3-3 in FIG. 2 of the tray of FIG. 2.

As shown in FIGS. 2-4, tray 28 is substantially rectangular and a bottom of the tray 28 is substantially planar. Tray 28 has recesses 44, 48, and 50 along internal sides of the tray 28. According to one embodiment, each internal side of the tray 28 has a recess disposed therein. Additionally, at least one external side of the tray 28 includes a draft or tray protrusion 52. According to one embodiment each external side of the tray 28 has a corresponding tray protrusion 52, 56, 60, and 64. In other words, the peripheral edges of the tray 28 each have a tray protrusion. According to one embodiment, the tray protrusions 52-64 extend outwardly, substantially perpendicularly to the external sides of the tray 28. It will be appreciated by one of ordinary skill in the art, however, that the tray protrusions 52-64 may extend from external sides of the tray 28 at angles other than 90° without departing from the scope of the present invention.

As shown, for example, in FIGS. 3 and 4, the tray protrusions 52-64 are illustrated as being rounded. One of ordinary skill in the art will understand, however, that the tray protrusions 52-64 are not limited to being rounded and may have different shapes, such as being plate-like, pointed, cylindrical, or dovetail-shaped.

The tray 28 may be formed of plastic, such as HDPE, polypropylene, ABS, or LDPE. According to one embodiment, the tray 28 is formed of nylon, glass filled nylon, or fiberglass. According to another embodiment, the tray 28 is formed of PVC. As will be described in greater detail below, in addition to mechanical connection, such as a snap-fit connection, between the tray 28 and the cover 24 due to the tray protrusions 52-64, when the tray 28 is formed of PVC and the cover 24 is formed of polymer concrete the tray 28 and the cover 24 form a chemical bond connection during the curing of the polymer concrete.

FIGS. 5-8 respectively illustrate top, side elevational, bottom, and end elevational views of the identification plate 32. As noted previously, identification indicia 36 are generally disposed on a top surface 66 of the identification plate 32. One of ordinary skill in the art, however, will appreciate that identification indicia 36 may be disposed on other surfaces of the identification plate 32, such as a bottom surface 68 if the plate is transparent, without departing from the scope of the present invention. As shown in FIGS. 5-8, identification plate 32 is substantially rectangular and thin. In other words, the bottom surface 68 is substantially planar and the top surface 66 is substantially parallel to the bottom surface 68. Further, identification plate 32 has edge protrusions 70, 72, 76, and 80 on external sides thereof. Edge protrusion 70-80 correspond to the recesses (for example, 44, 48, and 50) disposed on the internal sides of the tray 28.

According to one embodiment, the identification plate 32 is somewhat flexible and the tolerances of the fit between the external surface of the identification plate 32 (including the edge protrusions 70-80) and the internal surface of the tray 28 (including the tray recesses, e.g., 44-50) are sufficient to provide a snap-fit between the identification plate 32 and the tray 28. When the identification plate 32 is inserted into the tray 28, the edge protrusions 70-80 engage and are retained by the recesses disposed on the internal sides of the tray 28 in a fairly tight fit to prevent inadvertent removal of the identification plate 32 from the tray 28, as well as possible actions by vandals. On the other hand, manipulation of the somewhat flexible plate may allow it to be removably received in the tray for replacement if the wrong plate is inserted into the tray or if the plate is damaged. Put differently, the interior of the tray 28 and the exterior of the identification plate 32 are made to conform closely so that the identification plate 32 is not easily removed, but can be removed without destroying the identification plate 32 or the tray 28. In addition, providing an adhesive between the plate and the tray is also contemplated to permanently couple the plate to the tray.

Figure 9:
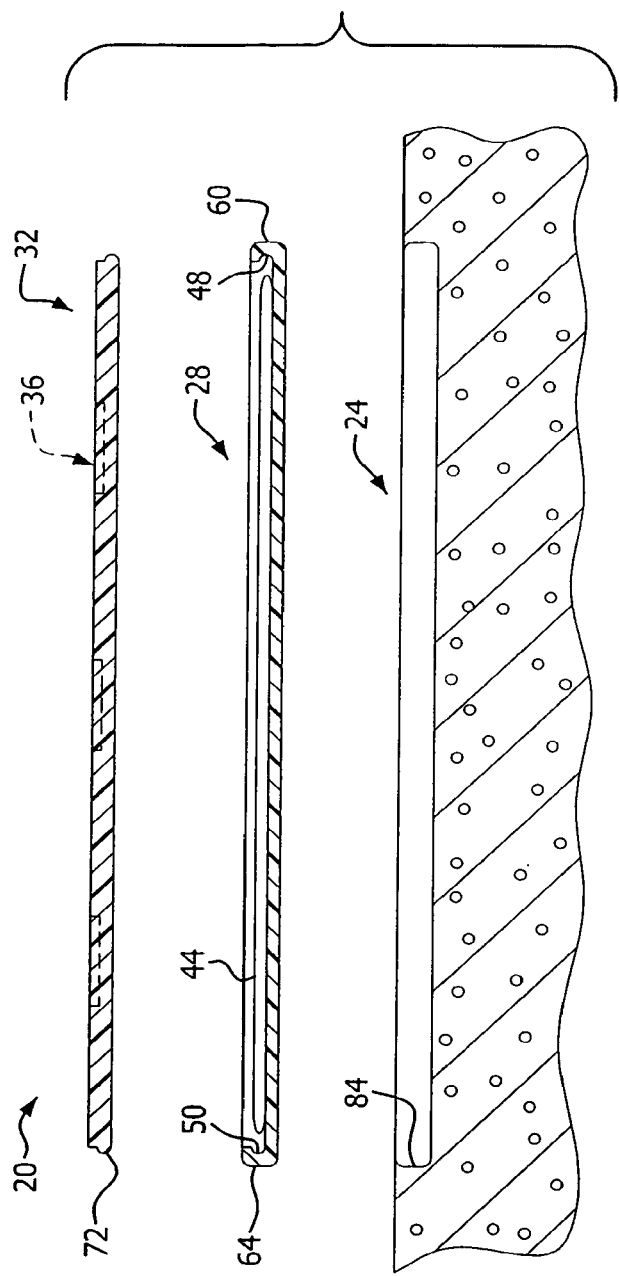
FIG. 9 is an exploded, vertical cross sectional view in elevation of a utility cover identification system of FIG. 1, including the tray of FIG. 2 and the identification plate of FIG. 5.
Figure 10:
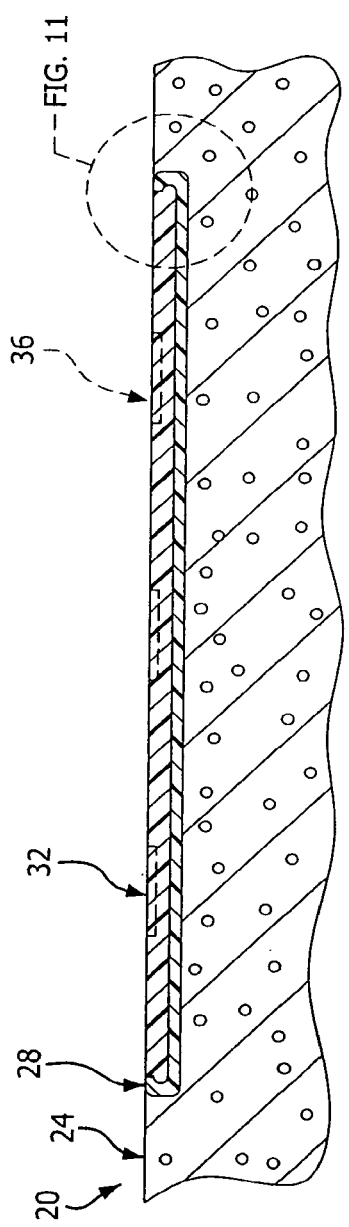
FIG. 10 is a vertical cross sectional view in elevation of the utility cover identification system of FIG. 1 taken along line 10-10 in FIG. 1 but with the identification plate received in the tray.

FIG. 9 is an exploded, vertical cross sectional view in elevation of the utility cover identification system 20, and FIG. 10 is a vertical cross-sectional view in elevation of the utility cover identification system 20 taken in along line 10-10 in FIG. 1. As shown in FIGS. 9 and 10, the tray 28 fits within a cover recess 84, and the identification plate 32 fits within the tray 28. More specifically, the cover recess 84 has a bottom surface that is substantially planar and substantially parallel to a top surface of the cover 24. Additionally, the cover recess 84 is substantially rectangular. Further, sides of the cover recess 84 form an overhang substantially corresponding to the shape of the tray protrusions 52-64. Thus, once the tray 28 is installed in the cover 24, after curing, the overhang of the cover is closely fitted over the tray protrusions 52-64, thereby mechanically securing the tray 28 in the cover 24.

When the tray 28 is fitted within the cover recess 84, the cover recess 84 engages the outer surface of the tray 28. In addition, according to one embodiment, the cover recess 84 is sufficiently vertically thick to completely receive the tray 28 therein. In other words, when installed, a top of the tray 28 is substantially flush with the top of the cover 24. Moreover, when the identification plate 32 is fitted into the tray 28, the interior surface of the tray 28 engages the outer surface of the identification plate 32. Furthermore, according to one embodiment, the interior of the tray 28 is sufficiently vertically thick to completely receive the identification plate 32 therein. Put another way, when installed, the top surface 66 of the identification plate 32 is substantially flush with the top of the tray 28 and the top of the cover 24. Though the cover recess 84, the tray 28, and the identification plate 32 are shown as being substantially rectangular, one of ordinary skill in the art will appreciate that other shapes may be employed without departing from the scope of the invention.

Figure 11:
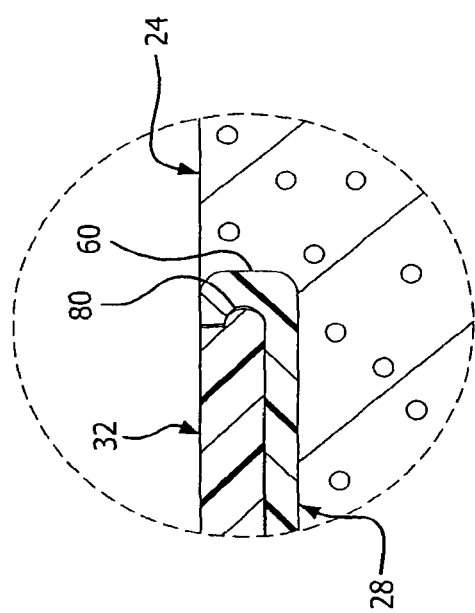
FIG. 11 is an enlarged view of the inset of FIG. 10.

Collectively, the internal tray recesses (for example, 44, 48, and 50) form a pocket in which the identification plate floats. More specifically, the edge protrusions 70, 72, 76, and 80 of the identification plate 32 fit within the corresponding tray recesses, for example, 44, 48, and 50. As best shown in FIG. 11, the collective pocket formed by the tray recesses retains the identification plate 32 while providing for thermal expansion and contraction of the identification plate 32. In other words, though the internal tray recesses retain the identification plate 32, a tolerance is designed with respect to the fit of the edge protrusions 70-80 and the internal tray recesses to provide for small movement of the edge protrusions 70-80 within the internal tray recesses, for example, to accommodate thermal expansion and contraction of the identification plate 32.

Additionally, as shown in FIGS. 9-11 the space beneath the identification plate 32, between the identification plate 32 and the tray 28, is minimized to minimize water intrusion between the identification plate 32 and the tray 28. Further, the material(s) selected to form the identification plate 32 are sufficiently flexible, and the edge protrusions of the identification plate 32 and corresponding tray recesses are sufficiently sized to accommodate the expansion of any water freezing between the identification plate 32 and the tray 28, while retaining the identification plate 32 within the tray 28.

Accordingly, the utility cover identification system 20 provides for a reduction in inventory supply, and therefore provides cost savings. For example if a supplier's business model calls for maintaining an inventory of 300 of each of gas, electrical, and water utility covers, rather than maintaining 900 utility covers, the retailer could, for example, maintain 400 covers 24 with embedded trays 28, and maintain 300 gas identification plates 32, 300 water identification plates 32, and 300 electrical identification plate 32. Such a utility cover identification system 20 would thus provide for a substantial decrease in the amount of space required for the inventory, as well as a reduction in the amount of capital required to maintain the inventory. In addition, because the identification plate 32 can be used with different size covers, inventory and space requirements can be further reduced, and thus, further savings can be realized.

Figure 12:
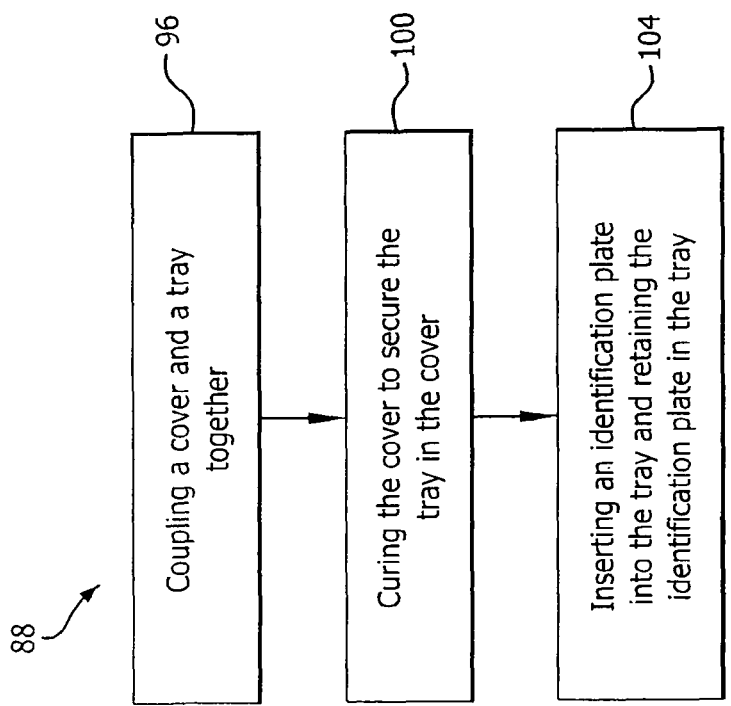
FIG. 12 is a series of block diagrams illustrating a method of manufacturing a utility cover identification system in accordance with an embodiment of the present invention.

FIG. 12 illustrates a method 88 of manufacturing a utility cover identification system. The method 88 includes step 96, in which a cover is coupled together with a tray, and step 100, in which the cover cures to secure the tray to the cover. Further, the method 88 includes step 104, in which an identification plate is inserted into the tray and retained. According to one embodiment the method 88 includes an additional step of curing the cover to shrink over a tray protrusion, thereby mechanically securing the tray with the cover. According to another embodiment, the method 88 includes an additional step of using polymer concrete to cast the cover and employing PVC to form the tray to create a chemical bond connection between the tray and the cover as the polymer concrete cover cures.

According to one embodiment, the coupling step includes casting the cover around the tray. According to another embodiment, the coupling step includes forming the cover with a recess in the top of the cover and inserting a tray into the recess of the cover prior to curing of the cover.

Embodiments of FIGS. 13-16

Figure 15:
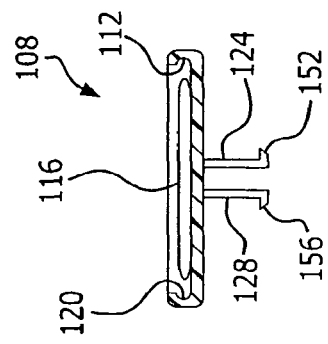
FIG. 15 is a vertical cross-sectional view in right end elevation of the tray of FIG. 13 taken along line 15-15 in FIG. 13.
Figure 13:
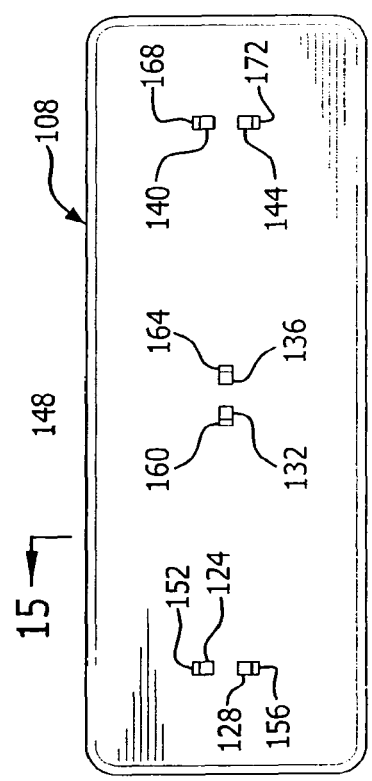
FIG. 13 is a bottom plan view of a tray in accordance with a second embodiment of the present invention.
Figure 14:
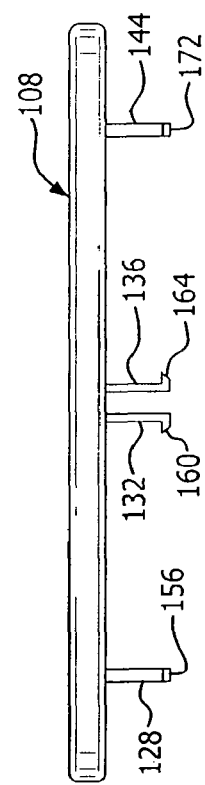
FIG. 14 is a side elevational view of the tray of FIG. 13.
Figure 16:
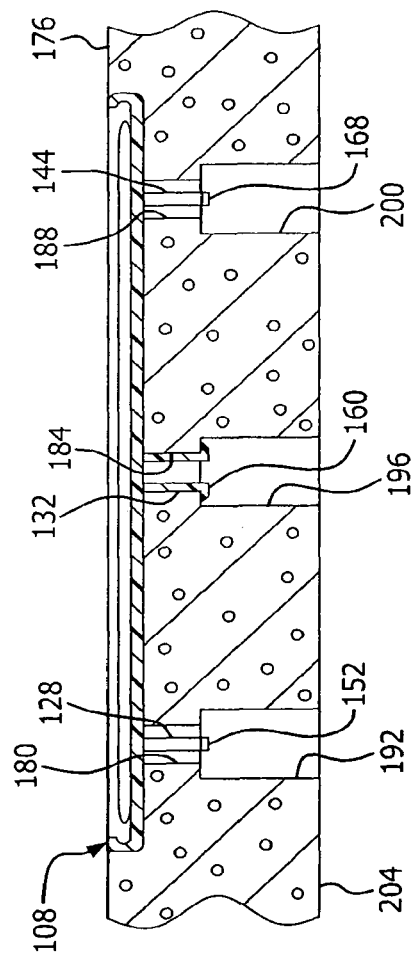
FIG. 16 is a vertical cross-sectional view in side elevation of a utility cover and the tray of FIG. 13.

FIGS. 13 and 14, respectively, are a bottom plan and side elevational views of a tray 108 in accordance with a second embodiment of the present invention. And FIG. 15 is a vertical cross-sectional view in right end elevation of tray 108 taken along line 15-15 in FIG. 13. Internally, tray 108 is substantially similar to tray 28. For example, like tray 28, tray 108 has recesses 112, 116, and 120 formed on its internal sides. And, internally, tray 108 receives an identification plate 32 in a manner substantially similar to that of tray 28. But as shown in FIGS. 14-16, unlike tray 28, tray 108 does not have protrusions disposed on a perimeter of thereof. Instead, according to one embodiment, the external side edges of the tray 108 are substantially perpendicular to a top surface of the tray 108. It will be understood by one of ordinary skill in the art, though, that the external side edges of the tray 108 may extend from the top surface of the tray 108 at angles other than 90° and may include tray protrusions thereon without departing from the scope of the present invention.

As shown in FIGS. 13-15, a plurality of tray protrusions or bosses 124, 128, 132, 136, 140, and 144 extend from a bottom surface 148 of the tray 108. According to one embodiment, the bosses 124-144 extend substantially perpendicularly to the bottom surface 148 of tray 108. In addition, the bosses 124-144 have feet 152, 156, 160, 164, 168, and 172 respective distal ends thereof. The feet 152-172 extend outwardly from the distal ends of the bosses 124-144. According to one embodiment, the feet 152-172 extend substantially perpendicularly from the bosses 124-144. One of ordinary skill in the art will appreciate that the feet 152-172 may extend from bosses 124-144 angles other than 90° without departing from the scope of the present invention.

FIG. 16 is a vertical cross-sectional view in side elevation of the tray 108 and a cover 176 in accordance with an embodiment of the present invention. Cover 176 has a plurality of bores 180, 184, and 188 therethrough. Moreover, cover 176 also has a plurality of counterbores 192, 196, and 200 extending from a side opposite to the side where the tray 108 is disposed (i.e., a bottom surface 204). The plurality of counterbores 192, 196, and 200 axially align with bores 180, 184, and 188, respectively. As shown in FIG. 16, the feet 152-172 of bosses 124-144 engage the counterbores 192, 196, and 200, securing the tray 108 to the cover 176.

While a plate bearing identification indicia could be secured to a utility cover having bores therethrough using bolts, screws, or other mechanical fasteners, utility covers are often large, and may weigh in excess of 300 pounds. Accordingly, using such fasteners to secure identification indicia to such a utility cover may be quite unwieldy. In addition, such a utility cover may leak water into its utility box via the bores.

FIGS. 13-16 illustrate that, according to one embodiment, the bosses 124-144 are grouped as pairs (for example, 124 and 128, 132 and 136, and 140 and 144) with each pair corresponding to a single bore in cover 176. Furthermore, to facilitate connection between the tray 108 and the cover 176, respective pairs of the bosses 124-144 have different orientations with respect to a longitudinal axis of the tray 108.

Figure 17:
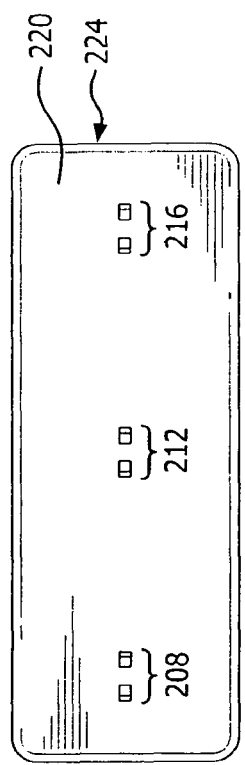
FIG. 17 is a bottom plan view of the tray in accordance with a third embodiment of the present invention.
Figure 18:
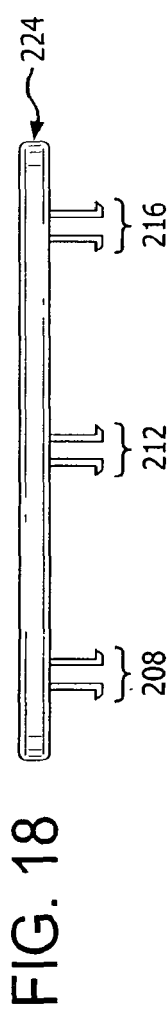
FIG. 18 is a side elevational view of the tray of FIG. 17.
Figure 19:
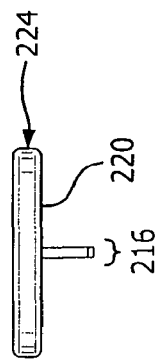
FIG. 19 is a right end elevational view of the tray of FIG. 17.

Embodiments of FIGS. 17-19

In a contrasting embodiment shown in FIGS. 17-19, pairs of bosses 208, 212, 216 extend from a bottom surface 220 of a tray 224 and are aligned substantially parallel to a longitudinal axis of the tray 224.

Figure 20:
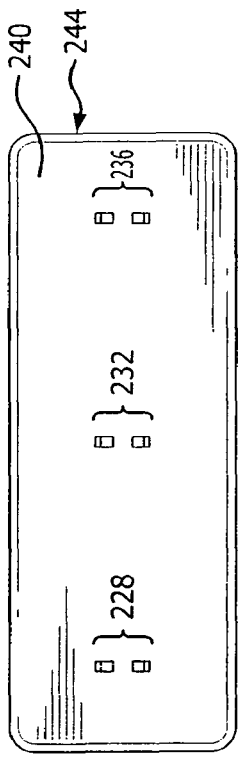
FIG. 20 is a bottom plan view of the tray in accordance with a fourth embodiment of the present invention.
Figure 21:
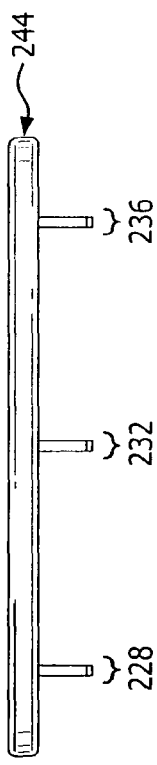
FIG. 21 is a side elevational view of the tray of FIG. 20.
Figure 22:
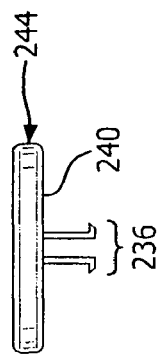
FIG. 22 is a right end elevational view of the tray of FIG. 20.

Embodiments of FIGS. 20-22

In another contrast an embodiment shown in FIGS. 20-22, pairs of bosses 228, 232, and 236 extend from a bottom surface 240 of a tray 244 and are aligned substantially perpendicularly with respect to a longitudinal axis of the tray 244.

Figure 25:
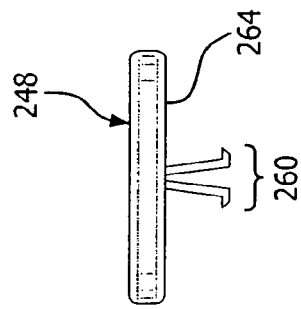
FIG. 25 is a right end elevational view of the tray of FIG. 23.
Figure 23:
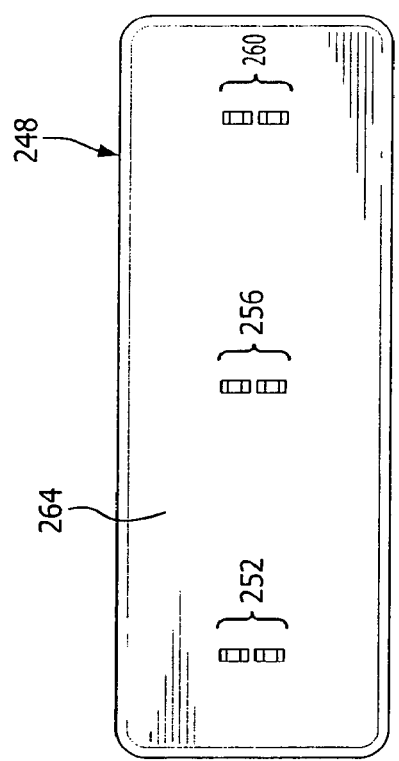
FIG. 23 is a bottom plan view of a tray in accordance with a fifth embodiment of the present invention.
Figure 24:
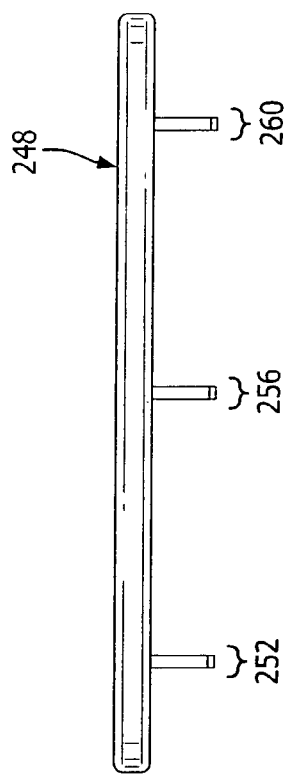
FIG. 24 is a side elevational view of the tray of FIG. 23.

Embodiments of FIGS. 23-25

FIGS. 23-25, respectively, are bottom plan, side elevational, and right end elevational views of a tray 248 in accordance with a fifth embodiment of the present invention. As shown in FIGS. 23-25, pairs of bosses 252, 256, and 260 extend from a bottom surface 264 of the tray 248. But in contrast to the previously described embodiments, individual members of the pairs of bosses 252, 256, and 260 do not extend perpendicularly from the bottom surface 264, and thus are splayed with respect to each other, as best illustrated in FIG. 25.

Though FIGS. 13-25 illustrate groupings of bosses as groups of two bosses, it will be understood by one of ordinary skill in the art that groups of three or more bosses may correspond to a single bore of a cover (for example 176) without departing from the scope of the present invention. Similarly, one of ordinary skill in the art will appreciate that bosses may have a one-to-one correspondence with bores in a cover.

In addition, though FIGS. 13-25 illustrate groupings of bosses aligned either are substantially perpendicular to, or substantially parallel to a longitudinal axis of a tray, one of ordinary skill in the art will understand that bosses or groupings of bosses may be aligned differently with respect to a longitudinal axis of the tray without departing from the scope of the present invention.

Embodiments of FIGS. 26-30

FIGS. 26-28, respectively, are bottom plan, side elevational, and right end elevational views of a tray 268 in accordance with a sixth embodiment of the present invention. FIGS. 26-28 illustrate bosses (or Christmas trees) 272, 276, and 280 extending from a bottom surface 284 of the tray 268. As best shown in FIG. 29, each of the bosses 272, 276, 280 has a plurality of ribs 292 extending outwardly therefrom.

FIG. 30 is a vertical cross-sectional view in side elevation of the identification plate 32 and the cover 176 described previously and the tray 268. As noted previously, FIG. 30 also illustrates identification indicia 36 being raised with respect to a top surface 66 of the identification plate 32. Additionally, as shown in FIG. 30, when the tray 268 is inserted into the cover 176, a subset of the plurality of ribs of each of the bosses 272, 276, and 280 are in contact with and are compressed by respective walls of the bores 180, 184, and 188. Additionally a subset of the plurality of ribs of each of the bosses 272, 276, and 280 extend into and engage the respective counterbores 192, 196, and 200 to facilitate engagement between the tray 268 and the cover 176, and prevent removal of the tray 268 from the cover 176.

Embodiments of FIGS. 31-34

FIGS. 31-33, respectively, are bottom plan, side elevational, and right end elevational views of a tray 288 in accordance with a seventh embodiment of the present invention. Bosses 292, 296, and 300 extend from a bottom surface 304 of the tray 288. FIG. 34 is a close up view of portions of a cover 308 and the tray 288. As best shown in FIG. 34, each boss (for example, 300) has a head portion 312, a main body portion 316, and two recessed portions 320 and 324 to facilitate engagement of the cover 308 and the tray 288. According to one embodiment, as shown in FIG. 34, in addition to the bosses 292, 296, and 300, the tray 288 also includes protrusions disposed on peripheral sides of the tray 288, for example, protrusion 326.

Embodiments of FIG. 35

FIG. 35 is a vertical cross-sectional assembly drawing of a cover 328 and the tray 108 of FIG. 13, according to an eighth embodiment of the present invention. As shown in FIG. 35, cover 328 has a plurality of bores 332, 336, and 340 therethrough. In addition, cover 328 has an engaging member 344 disposed within the cover 320. According to one embodiment, the engaging member 344 is a plate and has a plurality of engaging member bores 348, 352, and 356 corresponding to and being substantially axially aligned with bores 332, 336, and 340. The feet 152-172 of the bosses 124-144 are inserted through the engaging member bores 348, 352, and 356 to engage the engaging member 344. According to one embodiment the engaging member 344 is formed of a metal or metal alloy, such as aluminum, steel, stainless steel, bronze, copper, or other alloys. According to another embodiment (not shown), the engaging member is formed of plastic, such as HDPE, polypropylene, ABS, or LDPE. According to yet another embodiment (not shown), the engaging member is formed of nylon, glass filled nylon, or fiberglass. According to still yet another embodiment (not shown), the engaging member is formed of PVC.

Embodiments of FIG. 36

In accordance with a ninth embodiment of the present invention, FIG. 36 is a vertical cross-sectional view in side elevation of a cover 360 and the tray 108 of FIG. 13. The cover 360 has a plurality of bores 364, 368, and 372 therethrough. Further, the cover 360 has a plurality of engaging members 376, 380, and 384 respectively disposed within the bores 364, 368, and 372. Each of the engaging members 376, 380, and 384 has a bore 388, 392, and 396 and a counterbore 400, 404, and 408, respectively. The feet 152-172 of the bosses 124-144 are inserted through the engaging member bores 388, 392, and 396 into the engaging member counterbores 400, 404, and 408 to engage the engaging members 376, 380, and 384. According to one embodiment, the engaging members 376, 380, and 384 are formed of plastic, such as HDPE, polypropylene, ABS, or LDPE. According to another embodiment, the engaging members 376, 380, and 384 are formed of nylon, glass filled nylon, or fiberglass. According to yet another embodiment, the engaging members 376, 380, and 384 are formed of PVC. According to another embodiment (not shown), the engaging members 376, 380, and 384 are formed of formed of a metal or metal alloy, such as aluminum, steel, stainless steel, bronze, copper, or other alloys.

Figure 37:
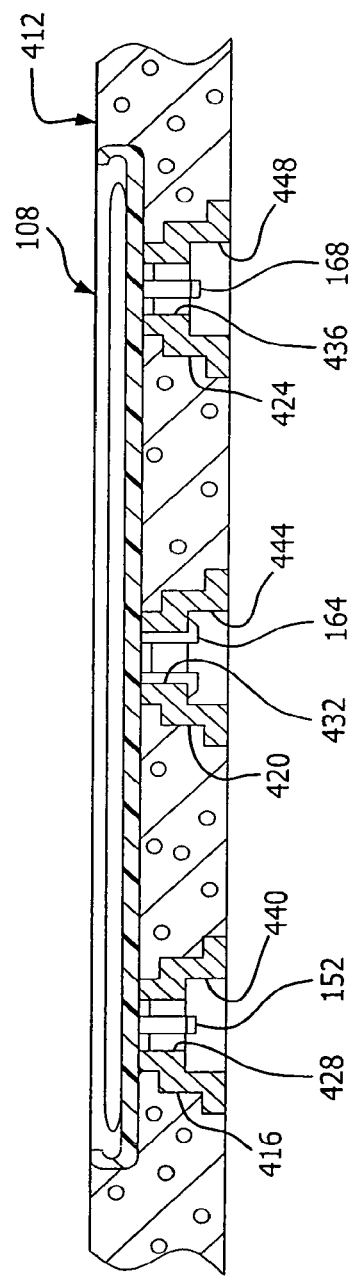
FIG. 37 is a vertical cross-sectional view in side elevation of a cover in accordance with a tenth embodiment of the present invention and the tray of FIG. 13.

Embodiments of FIG. 37

FIG. 37 is a vertical cross-sectional view in side elevation of the tray 108 and a cover 412 in accordance with a tenth embodiment of the present invention. The cover 412 has a plurality of engaging members 416, 420, and 424 disposed within the cover 412. Each of the engaging members 416, 420, and 424 has a bore 428, 432, and 436 therethrough and a counterbore 440, 444, and 448. The feet 152-172 of the bosses 124-144 are inserted through the engaging bores 428, 432, and 436 into the engaging member counterbores 440, 444, and 448 to engage the engaging members 416, 420, and 424. According to one embodiment the engaging members 416, 420, and 424 are formed of a metal or metal alloy, such as aluminum, steel, stainless steel, bronze, copper, or other alloys. According to another embodiment (not shown), the engaging members 416, 420, and 424 are formed of plastic, such as HDPE, polypropylene, ABS, or LDPE. According to yet another embodiment (not shown), the engaging members 416, 420, and 424 are formed of nylon, glass filled nylon, or fiberglass. According to still yet another embodiment (not shown), the engaging members 416, 420, and 424 are formed of PVC.

Figure 38:
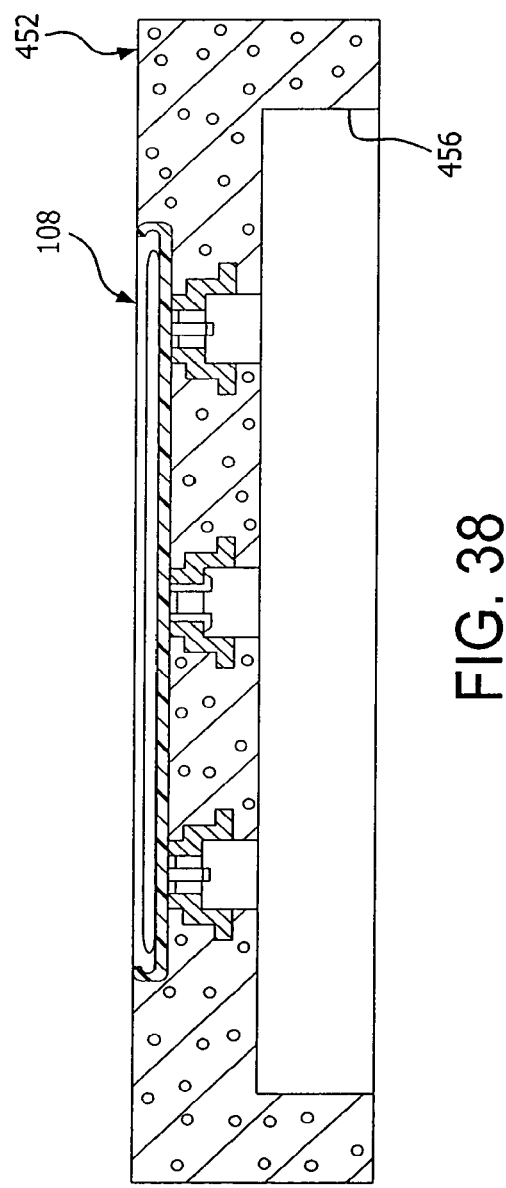
FIG. 38 is a vertical cross-sectional view in side elevation of the cover in accordance with an eleventh embodiment of the present invention and the tray of FIG. 13.

Embodiments of FIG. 38

In accordance with an eleventh embodiment of the present invention, FIG. 38 is a vertical cross-sectional view in side elevation of the tray 108 and a cover 452. The cover 452 is similar in most respects to the cover 412 described previously, except that the cover 452 is thicker. To reduce the weight of the cover 452, a recess 456 is formed in the bottom thereof.

While advantageous embodiments have been chosen to illustrate the invention, it will be understood by those skilled in the art that various changes and modifications can be made therein without departing from the scope of the invention as defined in the appended claims and their equivalents.

What is claimed is:

1. A method of manufacturing a utility cover identification system, the method comprising the steps of:
    coupling a polymer concrete cover and a PVC tray together such that the tray is substantially flush with an outer surface of the cover, wherein the tray comprises a substantially flat bottom surface, internal sides, and recesses along disposed in the internal sides of the tray;
    curing the polymer concrete cover to secure the PVC tray to the cover with a chemical bond between the cover and the tray, and
    inserting an identification plate comprising edge protrusions corresponding to the tray recesses into the tray such that the protrusions are received into the recesses and retaining the identification plate in the tray.

2. The method according to claim 1, wherein the coupling step comprises
    casting the cover around the tray.

3. The method according to claim 1, wherein the coupling step comprises
    forming the cover with a recess in the top of the cover, and inserting the tray into the recess of the cover prior to curing of the cover.

4. The method according to claim 1, and further comprising the step of
    creating a bore extending through the cover and a counterbore extending from a bottom surface of the cover opposite to the top surface to engage a boss extending from the tray.

5. The method according to claim 1, wherein the curing step comprises
    curing the cover to shrink over a tray protrusion, thereby mechanically securing the tray with the cover.

6. A method of manufacturing a utility cover identification system, the method comprising the steps of:
    coupling a cover and a tray together
    curing the cover to secure the tray to the cover, and inserting an identification plate into the tray and retaining the identification plate in the tray, wherein the forming step comprises
using polymer concrete to cast the cover and employing a PVC tray to create a chemical bond connection between the tray and the cover.

* * * * *